(12) United States Patent
Costa et al.

(10) Patent No.: US 7,562,831 B2
(45) Date of Patent: Jul. 21, 2009

(54) SNOWMAKING PROCESS

(75) Inventors: Dominic Charles Costa, Voorhees, NJ (US); Stanley J Kostka, Cherry Hill, NJ (US)

(73) Assignee: Aquatrols Corporation of America, Inc., Paulsboro, NJ (US)

( * ) Notice: Subject to any disclaimer, the term of this patent is extended or adjusted under 35 U.S.C. 154(b) by 1292 days.

(21) Appl. No.: 10/154,109

(22) Filed: May 22, 2002
(Under 37 CFR 1.47)

(65) Prior Publication Data

US 2003/0006291 A1    Jan. 9, 2003

Related U.S. Application Data

(63) Continuation of application No. 09/564,116, filed on May 3, 2000, now Pat. No. 6,464,148.

(60) Provisional application No. 60/132,327, filed on May 3, 1999.

(51) Int. Cl.
*F25C 3/04*   (2006.01)
(52) U.S. Cl. .................. 239/2.2; 239/14.2; 239/433; 62/69; 62/74

(58) Field of Classification Search ............... 239/2.1, 239/2.2, 14.1, 14.2, 418, 433; 62/69, 74
See application file for complete search history.

(56) References Cited

U.S. PATENT DOCUMENTS

| | | | | | |
|---|---|---|---|---|---|
| 3,596,476 | A | * | 8/1971 | Jakob et al. ................. | 239/14.2 |
| 3,760,598 | A | * | 9/1973 | Jakob et al. ................. | 239/2.2 |
| 4,004,732 | A | * | 1/1977 | Hanson ...................... | 239/2.2 |
| 4,634,050 | A | * | 1/1987 | Shippee ..................... | 239/14.2 |
| 4,742,958 | A | * | 5/1988 | Bucceri ..................... | 239/2.2 |
| 4,793,142 | A | * | 12/1988 | Bucceri ..................... | 239/2.2 |
| 5,124,466 | A | * | 6/1992 | Azechi et al. ............... | 556/425 |
| 5,266,367 | A | * | 11/1993 | Miura et al. ................. | 62/74 |
| 5,660,935 | A | * | 8/1997 | Kambayashi et al. ....... | 428/405 |
| 5,753,370 | A | * | 5/1998 | Kambayashi et al. ....... | 428/405 |
| 6,151,902 | A | * | 11/2000 | Stenlake, Jr. ................ | 62/69 |
| 6,464,148 | B1 | * | 10/2002 | Costa et al. ................. | 239/2.2 |

\* cited by examiner

*Primary Examiner*—Steven J Ganey
(74) *Attorney, Agent, or Firm*—John A. Shedden

(57) ABSTRACT

The invention relates to artificial snowmaking and specifically to the discovery that by introducing an effective amount of organo-modified polysiloxane material to the water being supplied to the snow guns, the quality of the snow thus made is significantly enhanced.

2 Claims, No Drawings

SNOWMAKING PROCESS

This is a continuation of U.S. Ser. No. 09/564,116 filed May 3, 2000 now U.S. Pat. No. 6,464,148 which claimed the benefits accorded under 35 U.S.C. 119 (e) of prior provisional application U.S. Ser. No. 60/132,327 filed May 3, 1999.

FIELD OF THE INVENTION

This invention relates to snowmaking and, more particularly, to a process whereby the use of certain organosilicone surfactant additives enhance the quality and making of the snow in vast quantities while reducing energy consumption.

BACKGROUND OF THE INVENTION

Many ski resorts have extensive snowmaking capability such that the resort has more control over the ski conditions throughout the ski season. The demand for snow has increased steadily with the large increase in the number of people involved in skiing, tubing, sledding, snowboarding, and the like sport activities. This need is especially acute at times when an insufficient supply of natural snow, particularly fresh powdered snow, is not available at winter resorts because of climatic or local weather conditions non-conducive to snowfall precipitation. It has been common practice to mechanically produce snow at such winter resorts for the aforementioned winter sports and the like by means of the atomization of water into fine droplets when ambient weather conditions are suitable for cooling the droplets to a temperature below the freezing point of water before the droplets reach the ground. In this manner, substantially all of the droplets become at least partially crystallized as snow while still airborne.

Typically in these processes, pressurized water and compressed air are exhausted through a nozzle at high speed to form vapor droplets which freeze when exposed to the ambient atmosphere.

Snowmaking methods and apparatus generally have been classified into two distinct groups, the so-called "air" and "airless" types. The former utilizes large quantities of compressed or pressurized air, usually at relatively high air pressures, which upon expansion shreds the atomized water particles from the spray nozzle into finer water particles or mist; implants seed crystals in the atomized water spray or fog; and cools the entire discharge zone to an extremely cold condition highly desirable for snowmaking. This temperature at discharge has been known to be as low as about −75° C. The airless type does not use compressed air, but instead, uses fans, a.k.a. fan guns, which blow the water as it leaves a nozzle to provide mixing and a fine dispersion which freezes to produce snow.

Because of differences in the control of water droplet breakup, propulsion, and ice nuclei generation, the air and airless snowmaking devices have different operating characteristics at various atmospheric temperatures. The airless-type devices typically excel at lower temperatures, i.e., less than about −4.5° C. The air-type snowmaking devices have operational advantages at temperatures near the freezing point of water, but are at a disadvantage at lower temperatures because their generally fixed mixing throat size, limits the amount of air which may be mixed with the water. In addition, these air devices are at a disadvantage in field use because of the relatively high air pressure—up to 100 psig or more—which is necessary to break up the water droplets to a sufficient degree.

Snowmaking apparatus, especially the snow guns, have improved dramatically over the last forty years and resorts are able to produce a large snow base as long as climatic conditions are generally cold. Most snow guns require a temperature below at least 0° C., preferably below −5° C., and most preferably below −7° C. Colder temperatures make the snowmaking process easier. Furthermore, to support many commercial winter resort operations, it is essential that these ambient conditions last for a period of time sufficient to permit snowmaking to continue until an adequate depth of snow is deposited on the area, terrain or slope desired to be covered. In areas of North Carolina and Tennessee, for example, during a typical winter sports season, there may be only 25 days with good conditions for making artificial snow. Farther north in Ohio, 30 to 40 days of snowmaking operations can ordinarily be expected and in Michigan, 50 days or more are not uncommon. Therefore, it is important for effective commercial operations that large volumes of quality snow be produced rapidly during those periods when conditions are right for mechanical, i.e., artificial snowmaking.

During the snowmaking process, heat transfer occurs primarily by two different mechanisms: convective heat transfer and evaporation of water. The role of the injected air in the snow gun, whether via compressed air or fanned air, is not to absorb the heat of fusion directly—calculations suggest that this air is directly responsible for from about 2 to 15% of the transferred heat energy—but rather to promote heat transfer from the water droplets to the cold ambient air. It does this by causing turbulence and by producing water droplets of desirable diameter. Serendipitously, compressed air supplies ice seeds upon expansion which aid in initiating the freezing process.

As an aside, a substantial amount of air is needed to freeze 10 gallons of water per minute which is the ordinary minimum production rate of commercial snow guns. If the air is bone-dry, it has been determined that the minimum amount of air required varies from 15,000 scfm at about −13.4° C. to 33,000 scfm at about −2° C. Nevertheless, such large quantities of air may be supplied by winds of even moderate velocity, i.e., about 1 to 10 feet per second. With respect to the compressed air per se being put through the orifices of the snow guns together with the water compositions, the compressed air flows at a rate amounting to a minor proportion by weight of said air with reference to the water composition.

With respect to droplet size, of course, smaller droplet size diameters yield larger area per unit mass and thus larger heat transfer. Since the residence time in the ambient air of a water droplet of a given diameter is dependent on the wind velocity, there is a practical lower limit for the droplet diameter. Thus, the droplet diameter has to be small enough to result in a sufficiently long residence time in the air and a sufficiently high heat transfer rate to complete the freezing process. However, in addition, it has to be large enough so that the water droplets will not be carried far away by the wind as mist which would cause difficulty in depositing the artificial snow on the desired areas.

Generally, commercial snow guns induce a vertical component to the droplets on the order of about 20 feet per second and thus the ambient air residence time has been estimated to be at least about 20 seconds. Therefore, the optimum size of a water droplet for snowmaking is accordingly determined by the rate of heat transfer, which must be sufficient to freeze the droplet in less than 20 seconds. Under typical atmospheric, snowmaking conditions, it has been determined that droplets ranging in diameter of from about 200 to 700 microns will freeze in less than 15 seconds and so this is generally accepted as the most desirable initial droplet size range for artificial snowmaking.

Even when the water droplet size, temperatures, droplet velocity and ambient air condition requirements are satisfied, snow may not be made satisfactorily. This is because water droplets of small size may supercool.

When a water droplet supercools, its temperature drops below 0° C. before solidification takes place; thus, the vapor pressure lowers and the overall heat transfer rate decreases. In fact, by reason of the inherent characteristics of water, in the absence of nuclei, it can supercool and remain in the liquid state even when reduced to a temperature as low as about −29° C. Furthermore, a supercooled droplet may only partially freeze before it falls to the ground. Its supercooled water is then frozen by conductive heat transfer with the cold ground, forming shells of ice instead of snow. Nuclei present in the water, such as inorganic and organic dust particles, including clay minerals, enable the water to freeze at higher temperatures, e.g., at −10° C. It is desirable to introduce nuclei which will cause the water or liquid to freeze at temperatures such as −5° C. or even higher.

Thus, the extent to which any liquid droplet will supercool is a function of its purity and there are few impurities suspended in water droplets, other than ice crystals themselves, which will initiate water crystallization at temperatures above −8.3° C. On the other hand, the presence of impurities in water often has the effect of lowering the actual freezing point temperature.

One method of avoiding the undesirable supercooling of water droplets is seeding. Seeding techniques that are currently known include the use of solid particles and sonic vibration. In the solid seeding of water droplets, materials that are utilized include e.g., silver iodide, whose threshold temperature (the highest temperature at which solidification may occur) is −3.9° C., cupric sulfide (−6.1° C.), and kaolinite (−10° C.).

Various techniques have been adopted by the snowmaking industry to achieve seeding of the water droplets. One method is to supercool and freeze at least some of the atomized water droplets in order to initiate crystallization and to use the ice crystals so formed to seed the other water droplets. Another technique utilizes the cooling effect of expanding air. The adiabatic expansion of air across the orifice of a nozzle operates to cool the immediate zone at the nozzle tip to a temperature low enough to initiate ice crystal formation in water droplets atomized by the expanding air and, in addition, as a result of the pressure reduction, the high level of moisture present in the compressed air upon expansion will condense, immediately forming seed crystals. These seed crystals are rapidly formed because of the extremely low temperature condition obtained through the expansion of the air, together with the freezing atmospheric conditions of winter, that is, temperatures below 0° C. In this process, the expansion of the compressed moist air usually occurs at the spontaneous nucleation temperature, which is about −40° C. for a 1 micron seed droplet. In another technique, the expansion of a liquified gas, such as propane, is utilized to achieve local supercooled temperatures for ice nucleation.

With ice crystal nucleation or seeding, the threshold temperature may be as high as 0° C. for both the seed and the droplet are of the same material; however, preferably the water droplets should be slightly supercooled at the point of seeding for if the water is above its freezing point when the seeds come into contact with the droplets, the crystals will be melted and destroyed.

In another approach, it has been found that the process for making artificial snow can be materially enhanced by providing ice nucleating microorganisms in at least some of the water droplets formed by the normal snowmaking operations of the type aforedescribed. The presence of such ice nucleating microorganisms in the water droplets initiates ice formation and tends to form snow crystals without the need to supercool the water by the amount heretofore required. For example, with such ice nucleating organisms, snow can be made from water droplets at air temperatures as warm as within the range of from about −7.8° to 0° C., somewhat independent of relative humidity, but preferably in the range of from about 65% to 100% relative humidity. The ice nucleating microorganisms can also be used to advantage at lower air temperatures although standard, non-additive methods are increasingly effective as the air temperature decreases below about −8.3° C.

With the presence of such ice nucleating microorganisms, snow can be made with enhanced rates of water flow even without special localized cooling techniques. Furthermore, in practice, only a few percent of the water droplets need contain the microorganisms since crystallization of the remaining droplets will be initiated in response to the contact or collision between the nucleated ice crystals and the others. The ice nucleating microorganisms are usually delivered to the snowmaking site in dried form and resuspended in a concentrated aqueous medium. A small amount of this concentrate is then injected into the snowmaking water supply.

A possible disadvantage to many of the ice nucleating microorganisms however, especially many of the nucleus-forming bacteria utilized for commercial snowmaking use is that they are phytopathogenic, and, as a result, the local environment could be adversely affected. Recently, however, new bacteria strains have been identified that appear to have ice nucleating properties, to be rapidly growing, and to be generally free of phytopathogenicity.

Additionally, certain fungi and lichen (which are symbiotic associations of algae (green algae and/or cyanobacteria and fungi)) have also been described as useful for enhancing the nucleation of water droplets in snowmaking processes. The lichen extract, suspension, or solution of ice nuclei is injected into a stream of droplets to be frozen or the lichen-containing ice nuclei can be added just prior to the aeration.

As an alternative to the use of nucleating agents, or, in addition, surfactants in powdered or liquid form added to the water "to reduce its surface tension, thereby facilitating its dispersion into fine droplets" has been disclosed (U.S. Pat. Nos. 3,760,598 and 4,634,050). Specifically, it is taught that any "commercially available household detergent may be used . . . powder . . . alkylaryl sulfonate, . . . liquid detergents . . . polyethylene glycol".

Numerous processes have been disclosed for making artificial snow via the use of an absorbent material, usually polymeric, which swells upon absorbing water. The water-swollen material is exposed to the ambient air, i.e., aerated and subsequently frozen. This product apparently "has a stiff, fine ice form, i.e., an "Eisbahn" in quality, rather than snow-like and, therefore, lends to agglomerate, that is, form ice blocks and have an undesirably high friction factor, i.e., is less "slippery" than natural or non-polymeric artificial snow. Therefore, when artificial snow suitable for use in covering ski slopes is made from the water-swellable material, addition of a surfactant, regulation of particle sizes and water content, and frequent grooming of slopes are necessary to prevent the excessive agglomeration of frozen particles. Such snow is rated among the most difficult snow to handle for ski hill operators" (U.S. Pat. Nos. 5,266,367 and 5,753,370). U.S.

Pat. Nos. 3,247,171, 3,022,279, 3,022,280, 3,251,194; International Publication WO 86107373; GB Patent Application No. 2,127,005; and Australian Patent No. 464,077 teach the aforesaid absorbent materials and their use.

Typical of the granular absorbent polymers that are disclosed for these artificial snow processes include starch, cellulose, polymers, copolymers, and terpolymers of acrylic acid, acrylic acid salt, methacrylic acid salt, styrene, vinyl ether and the like.

As previously mentioned, artificial snow produced by the swollen polymer method tends to form ice agglomerations or blocks which must be subsequently mechanically crushed. Alternatively, it has been disclosed that a surfactant may be added "to reduce surface tension of the water and to produce minute bubbles within the matrix of the snow crystals to create a honeycomb effect. Suitable surfactants include soap and detergents", sulfates, aliphatic or aromatic alcohols, sulfonates, and "anionic, cationic, and nonionic surfactants." Furthermore, it is disclosed that when "anionic or cationic surfactants are used, the polymer becomes anionic or cationic and causes the snow crystals to oppose each other" (U.S. Pat. No. 4,742,958).

At least one patent (U.S. Pat. No. 5,753,370) discloses the use of a crosslinked polymeric absorbent material in a snowmaking process. In this procedure, the material is first crosslinked in the presence of an inorganic substance, such as white carbon, talc, hydrotalcite, and pulverized silica and a conventional surfactant and then these granules are coated with a fluorine-containing material and/or a silicone oil. The final product is taught to be laid upon an artificial frozen floor or blended with conventionally made artificial snow.

One of the disadvantages associated with many of the heterogeneously nucleated processes is the tendency of these additives to restrict or plug the snowmaking injectors or nozzles and lines.

Those skilled in the art of making artificial snow have developed criteria for defining the "quality" of the snow. These qualities, which to one not skilled in the snowmaking art, may seem to be somewhat arbitrary and qualitative, actually are quantified and have been accepted throughout the snowmaking industry as defined standards. Three terms are widely used throughout the industry to define the condition of the snow being generated. These terms are: "relatively wet", "intermediate", and "relatively dry". "Relatively wet" artificial snow is known as that which will ooze water when a mass of such snow is picked up in the hand from that which has been deposited and squeezed. "Intermediate" artificial snow will form a dense ball when squeezed in the hand without any substantial release of water while "relatively dry" snow will lightly pack with no significant adhesion of particles such that no tight snowball can be formed. For optimum buildup with the best quality for skiing and the other winter snow sports, the "intermediate" snow is preferred. Achieving a slope of uniformly "intermediate" snow is complicated by factors such as the necessity of insuring that the newly deposited snow is not covered by fresh particles for at least one second, preferably two seconds or greater to allow the intermediate snow to set up and the fact that the snow dispersion area pattern in front of a snow gun contains all three "types" of snow, i.e., the "relatively wet" immediately in front of the nozzle; the "relatively dry" snow particles in the area of the farthest trajectory and the "intermediate" snow in the middle of the pattern. In an attempt to circumvent these problems, certain snowmaking operations have placed the "guns" in an elevated position and then oscillated them, i.e., swept the gun nozzles back and forth horizontally. The actual movement of the discharge ports of the snowmaking apparatus can be controlled by any number of mechanical, electrical, hydraulic, pneumatic, and the like mechanisms while the vertical motion is readily accomplished with a hydraulic motor or motor gear assembly. These systems are operated either automatically or manually at the snowmaking machine itself or remotely.

Overall, however, there is no question that the most expensive component in any practical snowmaking system is the capital and operating costs associated with supplying the compressed air, which represents about 90 percent of the costs of the consumables.

In concluding this brief overview, the problems associated with the creation of artificial snow to cover ski slopes are many and include the following:
(a) the investment, maintenance and operating costs, especially energy usage costs, are extremely high;
(b) it is not easy to create large quantities of artificial snow that will ultimately realize a ski slope composed primarily of easily groomable "intermediate" snow;
(c) since snow conditions normally vary widely with the passage of time, it is difficult to maintain good quality snow on ski slopes for relatively long time periods; and
(d) under marginal temperature conditions, it is not easy to produce vast quantities of an artificial snow that does not form ice blocks that subsequently have to be mechanically crushed for use.

SUMMARY OF THE INVENTION

The present invention is a snowmaking process that eliminates or significantly reduces many of the problems inherent to the snowmaking procedures of the prior art. To wit, the process of this invention produces an extremely durable artificial "intermediate" snow with enhanced "slipperiness" characteristics in large quantities with significantly reduced energy and maintenance costs vis-a-vis similar quantities of artificial snow produced by conventional means.

These surprising and favorable results are realized by the introduction of an effective amount of an organo-modified polyether siloxane into the water supply of the snowmaking apparatus. Preferably, a solution of from about 2 to about 50 ppm of the organo-silicone is atomized by high-pressure air, creating particles that freeze into ice crystals and snowflakes.

DETAILED DESCRIPTION OF THE INVENTION

The instant invention relates to the discovery of an artificial snowmaking process which yields vast quantities of "intermediate" snow with enhanced properties including increased slipperiness, groomability, and durability. The invention comprises the step(s) of adding a property enhancingly effective amount of an organopolysiloxane to the snow gun water supply. Serendipitously, this additive does not cause injector plugging associated with many of the present commercial snowmaking additives.

Although any organopolysiloxane possessing surfactant properties would function acceptably, the preferred organo-modified polysilicone surfactants for use in this invention are of the general formula:

$$MD_yD'_xM \qquad (I)$$

wherein $M=Me_3SiO_{0.5}$ $D=Me_2SiO$ $D'=Me\ R\ SiO$ $Me=CH_3$ $R=C_nH_{2n}O(C_2H_4O)_a(C_3H_6O)_bR'$ wherein n is from 2 to 4, preferably 3; a is 3 to 25, preferably 3 to 15; and b is from 0 to 25, preferably 0 to 15; it being understood that the oxyalkylene groups may be random and/or block mixtures of oxyalkylene units.

R'=hydrogen, an alkyl group having 1 to 4 carbon atoms, or an alkyl ester group wherein the alkyl group of the ester has 1 to 4 carbon atoms. Each R' can be the same or different on any given molecule. Preferably, R' is hydrogen or methyl.

y=0 to 5, preferably zero.

x=1 to 5, preferably 1.

In general, the snowmaking processes comprise the steps of incorporating the snow property enhancingly effective amount of the organosiloxane surfactant into the water; and introducing the water as fine droplets into the atmosphere at a temperature below freezing whereby at least some of the droplets crystallize to form snow.

Preferably, the organosiloxane surfactant containing water is fed continuously under high pressure and at a low temperature to at least one orifice of a snow gun; continuously mixing with the water flow a stream of compressed air at a rate amounting to a minor proportion by weight of said air with reference to the water; and discharging the resulting air/water mixture from the orifice in the form of small droplets into the atmosphere at a temperature below freezing whereby at least some of the droplets crystallize to form snow.

Alternatively, the organosiloxane surfactant containing water is sprayed into a fan-generated large volume, unidirectional mechanical movement of air at substantially atmospheric pressure and at a temperature below about 0° C., thereby effecting at least partial crystallization of the droplets of the water in the spray.

The organopolysiloxane is present in the water to be atomized in a property enhancingly effective amount, preferably in the concentration range of from about 2 to about 50 ppm, most preferably from about 4 to about 20 ppm.

The desirable characteristics of the snow produced via the use of the organopolysiloxane as set forth in this invention are realized both with the use of "air" and "airless/fan" guns.

EXAMPLE I

During the winter season of 1998, Break-Thru® surfactant, a registered trademark of the Goldschmidt Chemical Corp. for a proprietary organo-modified polysiloxane nonionic surfactant is added to the water lines of a major commercial ski resort in the Pocono Mountains of Pennsylvania at a concentration of 5 ppm and subsequently blown, using high pressure air-type snowmaking guns, onto a portion of a slope used for snow-tubing activities.

It was observed and reported by the resort snowmaking personnel that on the "treated" snow portion of the slope, the tubes were sliding significantly farther than they had in the past when the slope was covered with snow made with conventional snowmaking equipment. Furthermore, the "treated" snow, i.e., the snow produced by the organopolysiloxane process of the instant invention, seemed "more slippery" than the untreated, conventionally made snow.

EXAMPLE II

Toward the end of the testing period of Example I, the ambient outside temperatures started to rise and a warming occurred which lasted for several days. It was observed and reported by the snowmaking staff of the resort that the snow on that part of the tubing hill that had been produced using the organopolysiloxane additive "lasted noticeably longer" than the conventionally made artificial snow. Furthermore, after the warm period had forced the closing of the tubing hill, it was observed that the only snow that remained on the hill in any quantity was that made with the polysiloxane surfactant, i.e., the "treated" snow.

EXAMPLE III

Experimentation with an "airless" gun, i.e., a fan gun, further demonstrates the property enhancing character of the organopolysiloxane additive process. A commercial fan gun is operated under marginal ambient temperature conditions wherein "relatively wet" snow is the primary product being produced. Without any other changes, Break-Thru® organopolysiloxane is introduced into the feed water to the fan at a concentration of about 5 ppm. The snow being produced by the fan gun is observed to change primarily to the preferred "intermediate" type of snow.

EXAMPLE IV

One of the best ways to judge the ski slope quality of man-made artificial snow is to observe how well it is able to be groomed. The biggest differences in "groomability" occur when the tracked machines operate right after the snow guns are turned off. Typically, artificial snow, without additives, is "glue-like" immediately after the snow guns are shut down. When a grooming machine is working on this type of snow, the snow sticks to the implements, e.g., the tracks and the slope will not groom out smoothly. This snow often will either turn to ice during the grooming process or become a loose granular sand-like product. Artificial snow made with commercially available additives often still grooms out wet, but a grooming machine can still work with it. At times, the snow with additives will also become granular, but it will still retain its ability to "pack" on the slope.

Additional experimentation is conducted at the major commercial ski resort of Example I wherein Break-Thru® siloxane surfactant at a concentration of 5 ppm is used in the water supplied to high pressure air type snow guns on a number of different trails on the upper half of a ski mountain. On alternate trails, similar air guns are used wherein the water contains commercial microorganism nuclei-inducing agents. Experimental results confirm that the artificial snow treated in accordance with the process of the instant invention, "groomed out better" than the microorganism induced snow. The snow produced using the organopolysiloxane additive, is able to be groomed into a smooth surface whereas the microorganism induced snow produced under similar conditions "grooms out chunky", i.e., grooms into "golf ball sized chunks".

EXAMPLE V

During the winter of 1999, Silwet L-77 organosilicone surfactant, a trademark of the Witco Co. for a proprietary, modified heptamethyl trisiloxane nonionic surfactant was added to the water lines of a major commercial ski resort in the Pocono Mountains of Pennsylvania at a concentration of about 5 ppm and subsequently blown, using high pressure air-type snowmaking guns, onto a portion of a ski slope.

Three test runs were conducted as set forth in Table I below under conditions wherein the ambient temperatures and relative humidities were stable. The skies were typically overcast with little or no wind. The results reflect the same gun used at the different conditions.

TABLE I

| | GUN | DRY BULB TEMP | RELATIVE HUMIDITY | WET BULB TEMP | FLOW RATE GPM WATER | FLOW RATE GPM W/AQUATROLS |
|---|---|---|---|---|---|---|
| TEST #1 | Avalanche 7 | 26° F. | 50% | 21° F. | 27 GPM | 35 GPM |
| | Omichron | 26° F. | 50% | 21° F. | 30 GPM | 36 GPM |
| | Avalanche 15 | 26° F. | 50% | 21° F. | 34 GPM | 39 GPM |
| TEST #2 | Avalanche 7 | 25° F. | 40% | 19° F. | 30 GPM | 36 GPM |
| | Omichron | 25° F. | 40% | 19° F. | 35 GPM | 40 GPM |
| | Avalanche 15 | 25° F. | 40% | 19° F. | 39 GPM | 46 GPM |
| TEST #3 | Avalanche 7 | 27° F. | 60% | 23° F. | 20 GPM | 24 GPM |
| | Omichron | 27° F. | 60% | 23° F. | 25 GPM | 30 GPM |
| | Avalanche 15 | 27° F. | 60% | 23° F. | 28 GPM | 34 GPM |

The data show that the addition of the Silwet L-77 organosiloxane surfactant as taught in this invention improved the amount of water that flowed through the nozzles of the snow guns thus increasing the amount of snow produced in a given time. The average water flow increase using the organosilicone surfactant of this invention with the Avalanche 7 snow gun was 23.3%; with the Avalanche 15 snow gun 20.4%; and with the Omichron snow gun 17.4%. It is noted that with varying test conditions that are under a variety of temperatures (both dry bulb and wet bulb) and relative humidities, the addition of the organosilicone surfactant increases the water flow rate through the snow guns which leads to an increase in the amount of snow produced in a given time. As a result, through this increase in snow production per unit of time via the organosiloxane addition of this invention, the same amount of snow can be produced as that realized with conventional, untreated water systems, in a shorter time and concomitantly with less air. This results in significant lower energy usage and associated costs.

A major advantage to the use of the organopolysiloxanes of this invention, is that they do not have to be premixed as is the case with most of the other snowmaking nuclei-inducing additives in use today and even if left in the hoses and lines for long periods of time, do not interfere with fluid flow through the nozzles and/or injectors of the snow guns.

While the invention has been described in detail and with reference to specific embodiments thereof, it will be apparent to one skilled in the art that various changes and modifications may be made thereto without departing from the spirit and scope of the invention.

What is claimed is:

1. A method for making intermediate quality snow comprising the steps of:
    a) incorporating an amount of organopolysiloxane surfactant into water at a concentration of from about 2 to about 50 ppm organopolysiloxane to produce a snow property enhancingly effective composition;
    b) feeding a continuous flow of said composition under high pressure and at a low temperature to at least one orifice;
    c) continuously mixing with said flow of said composition a stream of compressed air to form a composition and compressed air mixture at a rate amounting to a minor proportion by weight of said air with reference to the composition; and
    d) discharging the composition and compressed air mixture from said at least one orifice in the form of small droplets into the atmosphere at a temperature below freezing;
    whereby at least some of the small droplets crystallize to form intermediate quality snow.

2. A method for making intermediate quality snow comprising the steps of:
    a) incorporating into water an amount of organopolysiloxane surfactant at a concentration of from about 2 to about 50 ppm organopolysiloxane to produce a snow property enhancingly effective composition, the organopolysiloxane surfactant being of the formula:

$M D_y D'_x M$ wherein
    $M = Me_3SiO_{0.5}$
    $D = Me_2SiO$
    $D' = Me\ R\ SiO$
    $Me = CH_3$
    $R = C_nH_{2n}O(C_2H_4O)_a(C_3H_6O)_bR'$
    wherein n is from 2 to 4;
        a is from 3 to 25;
        b is from 0 to 25; wherein the oxyalkylene groups are random, block or mixtures of oxyalkylene units;
        R' = hydrogen, an alkyl group having 1 to 4 carbon atoms, or an alkyl ester group wherein the alkyl group of the ester has 1 to 4 carbon atoms
        y = 0 to 5; and
        x = 1 to 5; and
    b) feeding a continuous flow of said composition under high pressure and at a low temperature to at least one orifice;
    c) continuously mixing with said flow of said composition a stream of compressed air to form a composition and compressed air mixture at a rate amounting to a minor proportion by weight of said air with reference to the composition; and
    d) discharging the composition and compressed air mixture from said at least one orifice in the form of small droplets into the atmosphere at a temperature below freezing; whereby at least some of the small droplets crystallize to form intermediate quality snow.

* * * * *